(12) United States Patent
Stephenson et al.

(10) Patent No.: US 7,814,208 B2
(45) Date of Patent: Oct. 12, 2010

(54) SYSTEM AND METHOD FOR PROJECTING CONTENT BEYOND FIREWALLS

(75) Inventors: Mark M. Stephenson, New Carlisle, OH (US); Steven A. Walters, Dayton, OH (US)

(73) Assignee: Science Applications International Corporation, San Diego, CA (US)

( * ) Notice: Subject to any disclaimer, the term of this patent is extended or adjusted under 35 U.S.C. 154(b) by 1830 days.

(21) Appl. No.: 09/824,132

(22) Filed: Apr. 3, 2001

(65) Prior Publication Data

US 2002/0023143 A1 Feb. 21, 2002

Related U.S. Application Data

(60) Provisional application No. 60/196,096, filed on Apr. 11, 2000.

(51) Int. Cl.
*G06F 15/16* (2006.01)
(52) U.S. Cl. .................... 709/227; 709/218
(58) Field of Classification Search .......... 709/203, 709/217, 227–228, 206, 218; 713/200
See application file for complete search history.

(56) References Cited

U.S. PATENT DOCUMENTS

| | | | |
|---|---|---|---|
| 5,325,362 A | 6/1994 | Aziz | |
| 5,416,842 A | 5/1995 | Aziz | |
| 5,548,646 A | 8/1996 | Aziz et al. | |
| 5,550,984 A | 8/1996 | Gelb | |
| 5,602,918 A | 2/1997 | Chen et al. | |
| 5,606,617 A | 2/1997 | Brands | |
| 5,623,601 A | 4/1997 | Vu | |
| 5,706,427 A | 1/1998 | Tabuki | |
| 5,768,271 A * | 6/1998 | Seid et al. | 370/389 |
| 5,802,293 A * | 9/1998 | van der Sijpt | 709/203 |
| 5,805,803 A | 9/1998 | Birrell et al. | |
| 5,819,172 A * | 10/1998 | Campana et al. | 455/412.1 |
| 5,826,029 A | 10/1998 | Gore, Jr. et al. | |
| 5,828,833 A | 10/1998 | Belville et al. | |
| 5,864,666 A * | 1/1999 | Shrader | 726/15 |
| 5,870,562 A * | 2/1999 | Butman et al. | 709/217 |
| 5,898,784 A | 4/1999 | Kirby et al. | |
| 5,944,823 A | 8/1999 | Jade et al. | |
| 5,960,177 A | 9/1999 | Tanno | |
| 5,999,979 A * | 12/1999 | Vellanki et al. | 709/232 |
| 6,003,084 A | 12/1999 | Green et al. | |
| 6,026,430 A | 2/2000 | Butman et al. | |
| 6,055,236 A * | 4/2000 | Nessett et al. | 709/245 |

(Continued)

FOREIGN PATENT DOCUMENTS

WO WO 00/11832 3/2000

OTHER PUBLICATIONS

WayBack Machine for www.nts.com, Feb. 8, 1999, Feb. 20, 1999, and Oct. 13, 1999.*

(Continued)

*Primary Examiner*—Ajay Bhatia
(74) *Attorney, Agent, or Firm*—Banner & Witcoff, Ltd.

(57) ABSTRACT

A system and method for exchanging information between clients separated by firewalls is disclosed. A server may receive the information as posted through a browser client from beyond a first firewall and relay it to another client beyond a second firewall without lowering the security levels of the firewalls.

15 Claims, 7 Drawing Sheets

U.S. PATENT DOCUMENTS

| | | | | |
|---|---|---|---|---|
| 6,067,451 A * | 5/2000 | Campana et al. | ......... | 455/412.1 |
| 6,088,796 A * | 7/2000 | Cianfrocca et al. | .......... | 709/225 |
| 6,094,437 A * | 7/2000 | Loehndorf et al. | .......... | 370/420 |
| 6,101,543 A * | 8/2000 | Alden et al. | ................. | 709/229 |
| 6,104,716 A * | 8/2000 | Crichton et al. | ............. | 713/201 |
| 6,195,366 B1 * | 2/2001 | Kayashima et al. | .......... | 709/227 |
| 6,199,104 B1 * | 3/2001 | Delph | ........................ | 709/208 |
| 6,202,156 B1 * | 3/2001 | Kalajan | ....................... | 709/225 |
| 6,317,592 B1 * | 11/2001 | Campana et al. | ............ | 709/206 |
| 6,327,608 B1 * | 12/2001 | Dillingham | ................. | 709/217 |
| 6,385,644 B1 * | 5/2002 | Devine et al. | ............... | 709/206 |
| 6,412,009 B1 * | 6/2002 | Erickson et al. | ............. | 709/228 |
| 6,631,416 B2 * | 10/2003 | Bendinelli et al. | .......... | 709/227 |
| 6,662,221 B1 * | 12/2003 | Gonda et al. | ............... | 709/223 |
| 6,668,282 B1 * | 12/2003 | Booth et al. | ................ | 709/224 |
| 6,697,354 B1 * | 2/2004 | Borella et al. | ............... | 709/238 |
| 6,721,792 B2 * | 4/2004 | Erickson et al. | ............. | 709/227 |
| 6,754,621 B1 * | 6/2004 | Cunningham et al. | ....... | 704/219 |
| 6,754,831 B2 * | 6/2004 | Brownell | ..................... | 726/15 |
| 6,779,022 B1 * | 8/2004 | Horstmann et al. | .......... | 709/206 |
| 2002/0002591 A1 * | 1/2002 | Ketola | ........................ | 709/206 |
| 2002/0023037 A1 * | 2/2002 | White, Jr. | ..................... | 705/37 |
| 2002/0029276 A1 * | 3/2002 | Bendinelli et al. | .......... | 709/227 |
| 2002/0101998 A1 * | 8/2002 | Wong et al. | ................. | 713/153 |
| 2002/0147813 A1 * | 10/2002 | Teng et al. | ................... | 709/225 |
| 2002/0156901 A1 * | 10/2002 | Erickson et al. | ............. | 709/227 |
| 2003/0009698 A1 * | 1/2003 | Lindeman et al. | ........... | 713/201 |
| 2003/0145057 A1 * | 7/2003 | Throop | ....................... | 709/206 |
| 2003/0154254 A1 * | 8/2003 | Awasthi | ....................... | 709/206 |
| 2003/0191848 A1 * | 10/2003 | Hesselink et al. | ........... | 709/229 |
| 2003/0217149 A1 * | 11/2003 | Crichton et al. | ............. | 709/225 |
| 2004/0122905 A1 * | 6/2004 | Smith et al. | ................. | 709/206 |
| 2004/0199662 A1 * | 10/2004 | Karol et al. | .................. | 709/238 |
| 2004/0249958 A1 * | 12/2004 | Ozdemir et al. | ............. | 709/229 |
| 2008/0307517 A1 * | 12/2008 | Grigoriev et al. | .............. | 726/9 |

OTHER PUBLICATIONS

NTS, www.nts.com/support/tbwin.html, Sep. 20, 2004.*
NTS TunnelBuilder, TunnelBuilder for Mac User's Guide, Mar. 1999.*
NTS TunnelBuilder, Network Telesystems TunnelBuilder User's Guide, 1999.*
B. Aboba Microsoft, G. Zorn, Cisco, RFC 2809, Apr. 2000, Implementation of L2TP Compulsory Tunneling via Radius, Apr. 2000.*
W. Townsley, A.Valencia, Cisco Systems, A. Rubens, Ascend Communications, G. Pall, G.Zorn, Microsoft Corporation, B. Palter, Redback Networks, RFC 2661, Layer Two Tunneling Protocol "L2TP", Aug. 1999.*
P. Srisuresh, Campio Communications, RFC 2888, Secure Remote Access with L2TP, Aug. 2000.*
Port Numbers (Well Known Port Numbers), www.iana.org, printed Jul. 12, 2006, Jul. 11, 2006, pp. 1, 5, 191.*
ACM SIGCOMM Computer Communication Review, vol. 27 , Issue 4 (Oct. 1997) table of contents pp. 155-166, Year of Publication: 1997, ISSN:0146-4833.*
Internet Printout: http://www.dbovernet.com/httptunnel.htm—HTTP Tunneling/Port 80 Cloaking, dated Mar. 20, 2000.
Internet Printout: http://www.developer.java.sun.com/developer/technical/Articles/InnerWorking/Burr../index.htm—Burrowing Through Firewalls, dated Mar. 20, 2000.
The Java™ Enterprise Server Platform Brochure, Nov. 25, 1997.
O'Guin et al., "Application of Virtual Private Networking Technology to Standards-Based Management Protocols Across Heterogeneous Firewall-Protected Networks", pp. 1251-1255, 1999 IEEE.

* cited by examiner

SYSTEM AND METHOD FOR PROJECTING CONTENT BEYOND FIREWALLS

Related Application Information

This application claims priority under 35 U.S.C. 119(e)(1) to U.S. Provisional Application Ser. No. 60/196,096, filed Apr. 11, 2000.

BACKGROUND

1. Technical Field

The present invention relates generally to the exchange of data between networks. More particularly, the invention relates to sending information beyond a firewall.

2. Related Art

Firewalls, while protecting data behind them, can be cumbersome to coordinate during the transfer of information between networks using them. Generally, port 80 or 8080 is open to traffic sent to and received from the Internet. To establish a path of communication between computers separated by a firewall, either additional ports need to be opened or a Virtual Private Network (VPN) by Alcatel Data Network, U.S. Pat. No. 5,768,271, with additional open ports needs to be established. Due to regulations imposed by a company's information system department preventing reduced security, it may not be possible to establish a VPN due to requirements to modify a firewall or open additional ports for a direct connection between the clients. Accordingly, a system is needed to permit communication between two computers in which one or more firewalls exist between them that is easy to establish and maintain without affecting the security features of the existing firewalls as well as efficiently transferring data between end users.

In short, if two computers are each behind firewalls, there is no way for them to exchange data directly because firewalls hide them from each other and from the public Internet. By placing a server on the public Internet, both computers can access the public server and the public server can relay the data between the two computers. The Hyper-Text Transfer Protocol (HTTP) allows bi-directional communication between a computer behind a firewall and an HTTP server computer on the other side of the firewall (usually on the public Internet). HTTP does not allow communications between two computers, each behind their own firewalls as it is always a client-server/server-client communication paradigm. At least one problem associated with repeated posting and retrievals is the number of delays associated with attempting to retrieve repeatedly posted information. Simply put, having a sender post information, the central server expose the information for downloading, then waiting for an end user to download the posted information leads to undesirable delays.

U.S. Pat. No. 6,104,716 to Crichton et al. relates to SOCKs-aware firewall, server and clients. One of the difficulties with the approach used in this patent is the need to modify the various transmitting and receiving entities to accommodate SOCKs as well as permit firewalls to accommodate SOCKs requests to open holes in the firewalls. However, firewall administrators do not want to permit programs to open new holes in firewalls, as this lessens the security provided by the firewall. Notably, Crichton requires the modification of the firewalls to be SOCKs-compatible. The proxy software communicates with the SOCKs proxy software existent on the firewall. Without the SOCKs proxy software on the firewall, Crichton's communications are disabled or cannot be established. This requirement of the SOCKs proxy software forces firewall administrators to explicitly configure the firewall and maintain a list of authorized users to enable SOCKs communications.

Internet Relay Chat (IRC) is another data transfer system using the Internet that end users may use to communicate with each other. However, IRC fails to protect the exchanged messages as they are transmitted without encryption. Further, various intermediary servers that intercept the chat messages may determine the sender's address, the receiver's address, and the content of the message. In some cases, the combination of these three pieces of information is sensitive if not confidential, thereby rendering this process unusable for information that needs to remain secure. Accordingly, IRC does not provide a satisfactory level of encryption for information. In addition, IRC protocol typically communicates uses TCP port 194, which is often blocked by network firewalls.

SUMMARY

A system and method for establishing and maintaining communications between computers communicating through at least one firewall is disclosed. In one embodiment, a first application residing on a first computer generates information that needs to be sent to a second application residing on a second computer, where the two computers are separated by two firewalls. An example is where the two computers are in firewall-protected companies that intend to communicate quickly with each other over the Internet. The first application sends the information to a client on its side of the first firewall. The client encrypts the information and posts it using HTTP to an intermediate server located, for example, on the Internet. The intermediate server forwards the encrypted information to a second client beyond the second firewall. The second client next decrypts the received encrypted information and passes it to the second application on the second computer. The system may also use compression to conserve bandwidth and authentication of the various parties to ensure identities.

Other embodiments exist where, for example, the intermediate server is incorporated into one of the first or second firewalls. In this example, the first firewall sends the encrypted information to the second computer without using a separate intermediate computer located between the two firewalls. An alternative embodiment includes the use of only one firewall separating the two clients with the server incorporated into the firewall.

Another embodiment relates to the modification of the client running on the first and second computers. The client may be a separate application that receives information from primary applications. Alternatively, the client may be a set of externally callable routines (a dynamic linked library (DLL), for example) that may be accessed by the primary applications. Further, the client may be a Java Class with multiple associated methods that may be accessed by the primary applications.

Numerous clients may communicate with each other using the system disclosed herein. For example, a first client may encrypt a message using a public key for a second client and a public key for a third client. The message may then be transmitted to the server for transmission to both the second and third clients for later decryption. Using this embodiment, joint collaboration over an encrypted system may be realized.

It is also appreciated that this system may be fully embedded within other systems. In these cases, the other system's functionality will be enhanced to allow multiple computers to communicate the other system's application-specific information from behind firewalls.

These and other embodiments will be realized as described in relation to the following description and related drawings.

DETAILED DESCRIPTION

Figure 1:
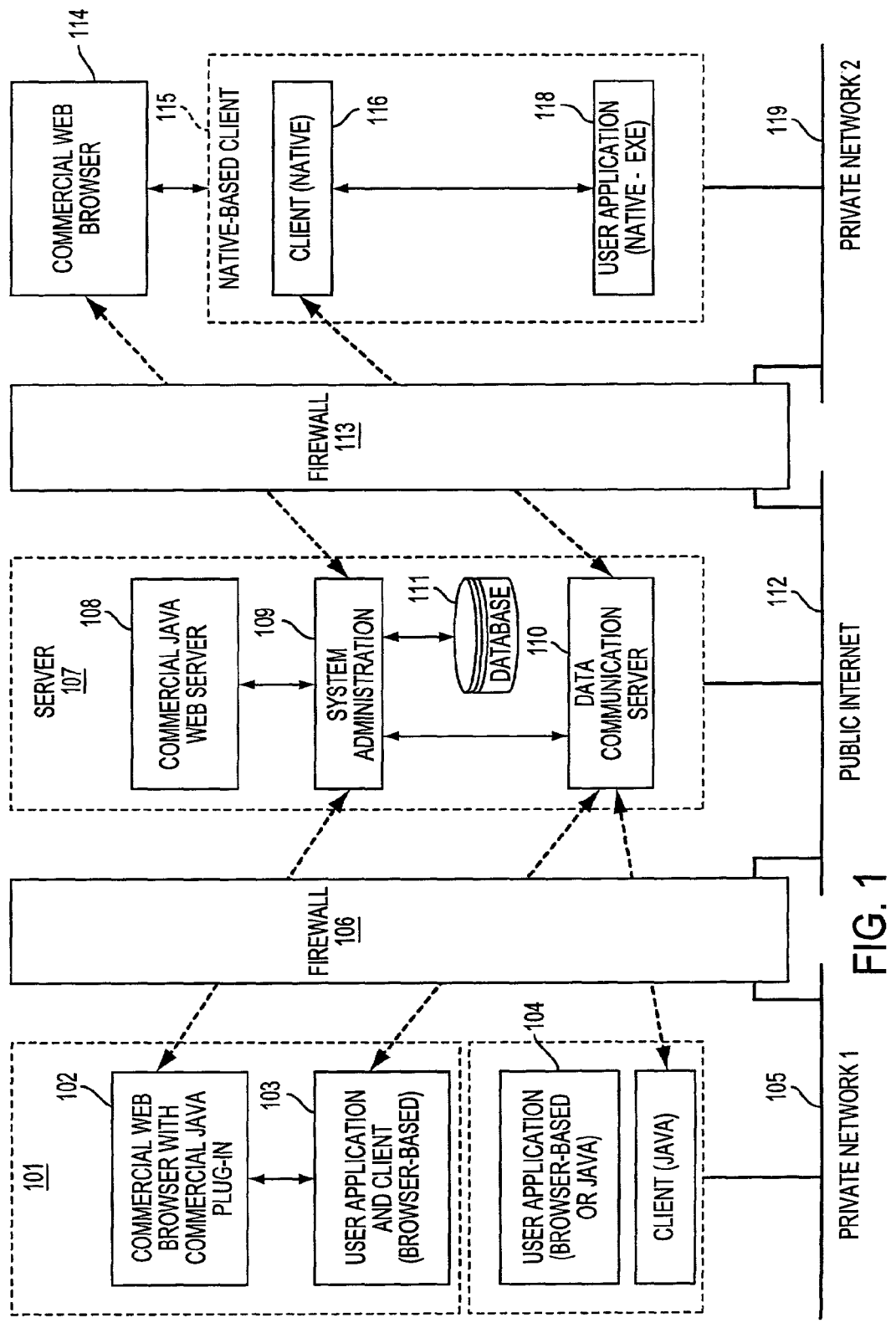
FIG. 1 shows a system architecture in accordance with embodiments of the present invention.

The invention enables users separated by at least one firewall to communicate with a decreased level of difficulty. The invention will be described in relation to hardware and software. It is appreciated that the methods described herein may take the form of software as embodied in a computer-readable form.

Definitions

To assist the reader, the following working definitions are provided. These definitions are not exhaustive and may be supplemented by well know definitions as well.

Client: The software and associated computer hardware that passes data from the application to the server.

Server: The software and associated computer hardware responsible for passing data between clients.

Attach: The process whereby a client establishes communication between a client and a server.

Connection: Established communication between two clients through the server.

Attachment: Established communication from a client to a server that is awaiting connection to another client.

Session: HTTP communication with a server that is identified by a unique attachment identifier. A session may include multiple HTTP exchanges using the same attachment identifier.

Filtered Network: A network with a firewall or other network device that selectively modifies or removes network traffic.

Unfiltered Network A network that passes all network traffic.

System Overview and Extensions

The system consists of two major components: a client software component and a server software component. The system permits two software applications residing on separate computers connected to separate networks, each with a firewall connection to a common network (such as the public Internet), to communicate with each other in a secure fashion through the firewalls via the common network. To accomplish this communication, each of the two software applications contains or is linked to the client. The client associated with each application communicates through its respective firewall or firewalls to the server on a separate computer located on the common network. Data from each application is received by the server and forwarded to the other application.

The system design uses two specific functional (or configuration) characteristics common to most network firewalls currently in use. The first is that most network firewalls are configured to permit users on computers behind firewalls to access data (e.g., web pages) on the public Internet. This is accomplished by allowing two specific Internet Protocol (IP) communication ports (Port 80 and Port 8080) through the firewall and then optionally screening data through these ports to assure that it has the proper Hyper-Text Transport Protocol (HTTP) format used for conventional web communication. Attempts to access other ports and other data formats are often prevented by the firewall. The second is that many network firewalls may act as "proxy servers" to prevent the network (IP) addresses of computers behind the firewalls from being accessible (or even visible) from outside the firewalls. The network address of the firewall computer is used as a proxy (or substitute) for the network addresses for all the other computers behind the firewall thus preventing direct access to those computers from outside. Address translation may or may not be implemented in all firewalls.

A characteristic of HTTP communication that facilitates security is that it can be initiated from a computer behind a firewall. Once initiated, data can be returned to the computer behind the firewall from a computer outside the firewall as long as the return communication is linked to the original outgoing communication. The client in an enabled software application initiates communication outward from behind its firewall to the server on the common network. This initiation may take the form of an HTTP post operation in which data from the application is packaged in an HTTP format and transmitted to the server through Port 80 or Port 8080. This HTTP post operation to the server may be performed by both enabled applications from behind their respective firewalls, which has the effect of also opening return paths to each application from the server. Data received by the server from each application via the post operation is forwarded to the other application through the return path opened by that application's initial post operation and vice versa. Also, a return path different from the forward path may be used.

In this way, the server enables the two enabled applications, each residing on computers behind separate firewalls, to communicate bi-directionally as if they are connected together over the same private network. Furthermore, neither firewall needs to be modified in any way to facilitate this communication. By incorporating robust error checking, and extensive authentication and encryption, this technique permits highly secure communications without the disadvantages of other techniques that require opening additional ports in the firewalls or establishing a Virtual Private Network (VPN), which may introduce additional vulnerabilities to the enterprise security.

Referring to FIG. 1, two clients 101 and 115 reside behind their respective firewalls 106 and 113. Client 101 may be a browser-based client or a java based client. Client 101 includes a commercial web browser (for example, Microsoft Corporation's Internet Explorer 5.5 or Netscape Corporation's Netscape Navigator 4.7) with commercial Java plug-in 102. The browser 102 communicates with client software 103 in client 101. The client software 103 also communicates with an end user application 104 (which may also be browser-based or java based).

Client 115 may have the same configuration as that of client 101. Alternatively, client 115 may have a different configuration as that shown in FIG. 1. Here, client 115 is a native-based client with client software 116.

The native client software 116 communicates with an end user application 118. Here, the end user application 1 18 is an independent application program.

Server 107 is made up of a publicly available Java web server 108, a system administration component 109 and a data communication server 110. For example, one may use the Sun-Netscape IPlanet web server, the IBM websphere server, and the Jakarta Project Tomcat web server.

The data communication server 110 implements the exchange of data between the client-enabled applications 104 and 118. The client (103 and 116) attaches to the application software (104 and 118) on each of two computers (101 and 115) that are connected to separate private networks (105 and 119) behind firewalls 106 and 113. The server 107 is installed on an intermediate third computer that is connected directly to a common network, usually the public Internet 112. When exchanging data, the application software 104 the first computer 101 behind firewall 106 transfers a message to the client 103 on that computer. The client 103 then compresses and encrypts the message, converts it to an HTTP post format, and sends it through the firewall 106 to the data communication server 110 on the intermediate computer 107. The data communication server 110 then forwards the message through the second firewall 113 to the client 116 on the second computer along the path of a previous HTTP post operation from the second computer 115. The received message is then decrypted and uncompressed, and delivered to the second application software 118. Transfers between applications may be made in either direction.

The server system administration component 109 allows system managers to add or modify users, change connections, monitor system performance, and gather accounting information, which is eventually stored in database 111. Further, administrator functions are served by a publicly available web server 108 (here shown as a Java-based web server).

As above, the client is available in at least two different configurations, a "native client" configuration and a "Java client" configuration. In the native configuration as shown in client 115, the client exists as a set of externally callable application interface (API) routines. The application software 118 connects to the client 116 (native configuration) through calls to the API routines for sending and receiving data and may be written in any language that supports API calls. For example, one may use a socket connection to access the APIs.

In the Java configuration, the client 101 is packaged as a Java Class with multiple methods in ".class" format. The application software 104 may take the form of a Java applet and connect to the client (Java configuration) by including the client class in the applet and invoking the client methods for sending and receiving data. Data from application 104 is transferred to client 103. Once in the browser-based client 103, an applet may access the server 110 for communication of data from application 104. The client ".class" file (Java configuration) may also be used in standalone application software that is written in the Java language. Web browsers 102 and 114 assist in the administration of the access rights to clients 101 and 115 and in the invocation of a browser-based client applet.

The following description relates to a number of embodiments. Further, there are several logical extensions and enhancements that are considered part of the invention.

Client Computer

The computer on which the client and associated application software reside may be any type of computer such as a personal computer (PC), a workstation, or an application server. For example, a database server may be located behind a corporate firewall and accessed from computers on the same private network with the server, from computers on the common network outside the firewall, or from computers behind a second firewall on another private network. The clients and associated applications do not need to involve human interaction. For example, two corporate transaction servers, each behind their own corporate firewalls, may exchange information on electronic business transactions. Clients may also be hosted on any electronic device capable of communicating on a network such as hand-held devices, printers, modems, etc. And the network between clients may be any combination of wired and/or wireless networks. For example, a Palm Pilot or other hand-held computing device may use a wired or wireless connection to communicate with a personal computer or server located behind a company firewall. In this way, a person traveling on business may synchronize their Palm PC or Palm OS device and information stored therein with a computer back at their office, even though the office computer is behind a firewall. Devices may also connect to other devices. For example, a hand-held computing device may print information on an office printer. The hand-held computing device may connect via wireless communications and print on a printer located behind a firewall.

As mentioned above, any kind of networked-computing device may host the client for communication using this technique. For the current implementation, standard PCs are used. These PCs have the following configuration: 350 MHz Pentium II, 128 MB of RAM, about 10 GB of disk space, and Ethernet. For commercial software, they are running Microsoft Windows NT Version 4.0, Sun Java Version 1.2, and standard web browsers. Computers of more or less capability may operate as clients as well. The processing overhead of this technique is small and results in minimal impact to the computer on which it executes.

Server Computer

The server software may execute on any computer outside the firewalls and on a network that is accessible to both communicating clients. The server function may be hosted on one or both firewall computers, or on one or more separate computers on the common network.

The server may use a standard, commercially available Web server and a Data Communication server. The commercial Web server serves all the web pages required for registration and system administration. The custom Data Communication server is responsible for the client connections and data exchange. The Data Communication server may be implemented using a commercial Web server. However, a conventional Web server is usually much less efficient because it is not designed to directly support the internal data exchange function for separate client connections. Accordingly, a simple web server for efficiently handling internal data exchange functions may be implemented that incorporate the additional data exchange factors.

The server is designed to operate on a standard computer connected to the public Internet. A standard computer may have the following configuration: 350 MHz Pentium II, 128 MB of RAM, about 10 GB of disk space, and Ethernet. The other commercial software that could be installed on the computer includes, an operating system such as Microsoft Windows Version 4.0, a Java Virtual machine such as Sun Java Version 1.2, and Java Web server such as Tomcat. Computers with more or less capability may also be used to host the server software. Other computer types, operating systems, programming languages/environments, and web servers may be us used as well.

Network Configurations

As mentioned above, the network may be implemented with any combination of wireless and/or wired networks. The networks may operate at various speeds and with various protocols as well. Communicating clients may use a protocol that is commonly allowed through their firewall or firewalls. Protocols may include SSL, FTP, mail, HTTP, and others. When using non-HTTP protocols, one uses the respective ports generally associated with these processes as well known within the industry. The two communicating clients could have HTTP access (or equivalent thereof) to the server through their firewall or firewalls. Alternative formats may be used, however, it is appreciated that having both clients using the same type of access to the server provides advantages by not needing separate translation of the implemented protocols. The server resides on a computer on a network with the ability to connect to private networks through firewalls.

Data Exchange

The invention treats the application data as binary data which has the feature of supporting all types of data. There is no minimum data size or a maximum data size. So the system may be used for file transfer, business-to-business electronic commerce transactions, chat, database server access, and the like. It may also support streaming data such as streaming video or audio, or real-time conferencing. In short, any type of information that needs to be exchanged may be exchanged with the invention.

System Administration Server

The system administration may use a standard server and standard web pages to implement user registration and system administration as are known in the art. For increased security, the web connection may be implemented using Secure Sockets Layer (SSL). This encrypted communication technique allows users and system managers to securely enter information such as usernames, passwords, and server configuration data. Other secure network networking techniques such as VPN may be employed or, in less critical application, standard unencrypted protocols may be used.

Data Communication Server

The following discloses an overview of a nine phases for establishing data communication along with alternative implementations.

Phase 1—Establish Communications

The client connects to the server via an HTTP post operation of a URL to the server. The client and server exchange information allowing identification of the client software (including, for example, software version number, a number provided by the server, a registration number, and the like) and verification of client software compatibility, and designation of a unique attachment identification identifying the specific client-server attachment. Next, the client and server establish a receive channel. A receive channel is a response to a post from the client that is opened by the server and may remain open until the communication is discontinued. This receive channel allows the server to send data to the client at any time. When no data is transmitted from the server to the client for a timeout period, the server sends a short message to the client to keep the firewall from breaking the connection. Also, if the client detects that the connection is broken, it will immediately re-establish the connection with another post operation. Alternatively, communication from the server to the client may be done without this technique if data requests from the client prompted the server to transmit data at frequent enough intervals to allow smooth communications from server to client. However, the receive-channel approach is more efficient for both the client and the server, and data communication can flow directly from the server without waiting for the client's periodic post.

Phase 2—Exchange Client-Server Key

After the client and server exchange software identification numbers and an attachment identifier, but before any additional data exchange, the client and server negotiate an encryption key. Various key exchange systems may be used such as a secret key exchange, a secure socket layer (SSL) exchange, or selection of predetermined keys. Further, a variety of key sizes may be supported including 56, 128, 168 . . . 1024, 2048 and the like. It is appreciated that using shorter key lengths speed key generation, encryption and decryption, while longer key lengths enhance security. To improve security, the key exchange is done first so that all future communication can be protected with encryption.

Phase 3—Encrypted Communications

Through the use of encryption, one may minimize the amount of unsecured data transmitted between entities in the system. As above, different mechanisms may be used to encrypt data.

Phases 4 and 5—Client and Server Authentication

Bi-directional authentication between the server and the client may be used to verify that only verified members are using the system. Authentication is bi-directional in that the server authenticates the client and the client separately authenticates the server. In one embodiment, an encrypted password exchange is used. Authentication may be implemented with one of many authentication techniques. For example, the entire process of key exchange, authentication, and SSL encryption may be implemented with VeriSign 40-bit or 128-bit encryption, digital certificates and SSL. Also, if security is less critical, then the requirements for key exchange, encryption, and authentication may be relaxed or even eliminated.

Phase 6—Establish Connection

Once the encryption and authentication are complete, the client requests connection to another client. The server either makes the connection to the other client or asks the client to wait for the other client to attach. The server supports multiple clients waiting and communicating. Each client identifies to the server the other client and application for connection. The connection process may be implemented in many different ways. For example, a fixed connection may be made between two business computers that require an on-going permanent connection.

Phase 7—Exchange Client-to-Client Key

A client-to-client key is a secure key exchange between the two connected clients. In a first embodiment, the clients connect directly with each other and establish a client-to-client key or directly exchange public keys of their own separate public/private key pairs. This technique insures that client-to-client data cannot be compromised, even with direct access to the server. As with other key exchanges mentioned above, any key exchange technique may be employed for this purpose. As a second option, a client-to-client key may be passed directly between clients without a secret key exchange.

The client-to-client key exchange can be implemented in many different ways. Also, the clients create a client-to-client key that may be a single key or may comprise the public keys of a public/private key pair. The key or keys may be transmitted to each other via email or the like by using the Internet or the key or keys may be exchanged by establishing a direct connection between the clients (direct dialup) or by transferring hard copies of the keys (mailing a disk with the key on it to another client). A variety of key exchange schemes as known in the art are possible.

Pre-establishing the client-to-client keys as described above save time by avoiding the key exchange and still provide encrypted client-to-client data. For very critical data, the direct client-to-client exchange may be the preferred approach mainly because a new key is generated with each new connection. Another option is to operate without client-to-client key exchange and without client-to-client encryption. This option would allow applications to encrypt their own data or to use no data encryption at all. For less critical data, no encryption may be required.

Phase 8—Connection Communications

While connected, the two clients may communicate with each other, transferring large amounts of data securely through using the server. To assist with passing large amounts of data during this phase, the system may compress the transferred data. Alternatively, the data may be left uncompressed. While compression may consume processing time of the clients, the size of the transmitted file will be reduced. With the reduced file size, the transmission time will be diminished, thereby alleviating the transmission load on the firewalls 106 and 113 and the server 107.

For example, application 104 transfers data to client 103 where the client compresses the data and transfers the compressed data through server 110 to client 116, which decompresses the data and passes the decompressed data to application 118. Different compression algorithms may be employed. Compression may be performed before or after encryption. Further, the compression system may also be eliminated if not needed or if compression may take too long.

In this example, standard zip compression is used. Alternatively, one may use other compression systems as are known in the art. After compressing the data, the client encrypts the data with the client-to-client key and sends the packet via an HTTP post. It is noted that an HTTP get may also be used as well as other known sending mechanisms. The server receives the post, decrypts the header using the received client-to-server key, and then encrypts the header with the destination client-to-server key before sending the packet to the destination client. The destination client decrypts the header with the client-to-server key, decrypts the data with the client-to-client key, and decompresses the data. The client software then passes the data to the application. The clients 103 and 116 may simply receive and transfer the data without alerting applications 104 and 118 of the compression and decompression of the data. One benefit of not alerting applications 104 and 118 to the existence of the compression and decompression of the data is that it permits applications 104 and 118 to generate and process the data without concern to the state of compression of the data. On the other hand, the system also includes an alternative embodiment in which the compression and decompression is handled by applications 104 and 118. In this alternative embodiment, the applications 104 and 118 compress and decompress the transferred data internally. An advantage of having applications 104 and 118 handle the compression and decompression is that the applications themselves may have a more efficient compression/decompression algorithm (as determined in size or lossyness). It is noted that FIG. 1 shows communications between applications 104 and 118. While not shown, application 104 may communicate with other applications 104 and application 118 may communication with other applications 118.

Phase 9—Terminate Communication/Connections

Either one of the clients or the server may initiate termination of communications. Any client or the server may send a message that causes the server to break the connection and prompts the clients to exit to the application. The application is notified if a connection is broken. Also, an application may request that the client break its connection with the server. Reasons for termination include extended delay between transmission and receipt of the communication, loss of connection with a client or to the server, end of data transmission by one of the clients, failure of one of the applications to process data, excess garbled data on a communication pathway, and the like.

Example Network Configurations

Figure 2:
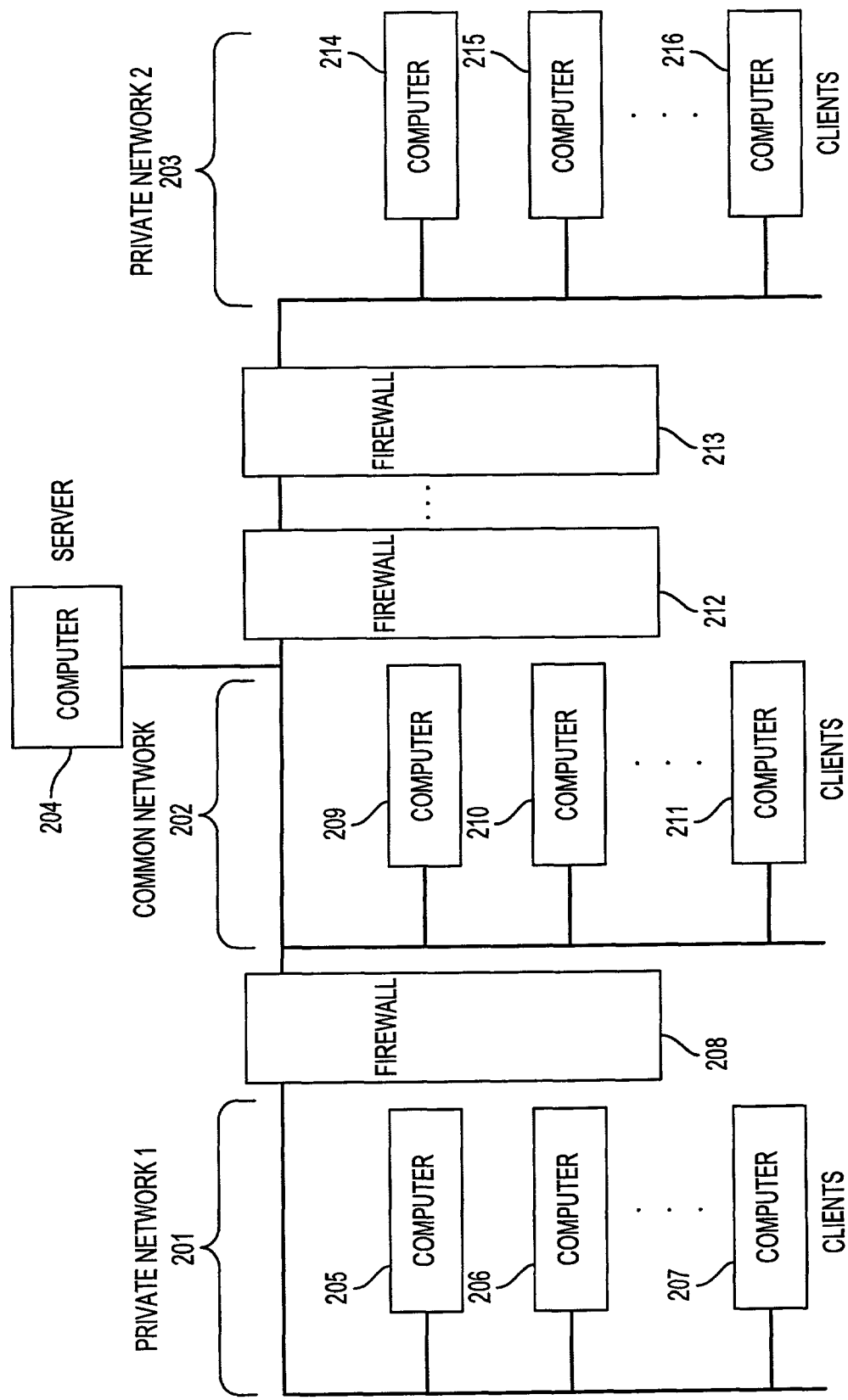
FIG. 2 shows various network configurations in accordance with embodiments of the present invention.

As shown in FIG. 2, there are at least three different network configurations where applications may need to communicate. FIG. 2 shows private network 1 201 with computers 205, 206, and 207 behind firewall 208. Private network 2 203 includes computers 214, 215, and 216 behind a number of firewalls 212, and 213. It is appreciated that firewalls 212 and 213 may be only a single firewall, but are shown here to illustrate a variety of network configurations. Common network 202 shows a number of computers 209, 210, and 211, not protected by a firewall and connectable to server computer 204.

First, when two computers 209 and 210 are on an unfiltered network 202 (no firewalls or other network traffic/protocol filtering devices), applications on the computers may communicate freely via standard TCP/IP socket communications. An "unfiltered network" includes devices or systems that monitor and can alter or block network communications. A "filtered network" may have a firewall or another network-filtering device that is configured to allow certain communication between known "friendly" computers. In this case, the network is effectively an unfiltered network with respect to those computers.

In the second configuration, one computer 205 is behind a firewall 208, and the other computer 209 is outside the firewall 208. A third configuration has a first computer 205 separated from a second computer 214 by at least two firewalls (208, 212, and 213). The present invention provides a solution for addressing each of these configurations.

System Administration

The server 204 provides system administration functions that register clients and managers, maintain, and monitor the server. The interface for the system administration tools may use a standard version 4.0 or later web browser. The software may be implemented as Java Servlets, standard HTML, and JavaScript. The information requiring persistence may be stored in databases. SQL queries may be used to access the databases. All the pages that display user information or server data may use encrypted communications. For security, in one implementation, any pages that require a user to login before the pages are accessed may be accessible only after the user logs in. Accessing "login-required" pages prior to logging in result in the display of an appropriate login screen.

User Registration Pages

The system may incorporate user registration pages providing form entry/modification of information needed to register a new user. The registration pages may provide entry of a username, an authentication password. As registration pages are known in the art, they will not be discussed in detail. However, it is noted that the password created in the registration pages may be used to encrypt and decrypt data. Alternatively, they may be used to provide seed information for the generation of new encryption keys. The passwords may be used for authenticating the client and the server prior to exchanging data. The user may register the client with a server. Also, the user may register applications with the client to alert the client for which applications to identify and direct content when received. User registration pages may be available to general users as well as to system administrators.

System Management and Usage/Performance Monitoring

Various pages may be extended to users as need be. For example, new users may register; managers may approve or disapprove of new users, may approve or disapprove of applications to be used with the system and the like.

Current Connections Display

Current connections are shown to a user. This display may take the form of a table that lists the current connections with information including the two usernames, the identification of the application transmitting and/or receiving data, the amount of data transferred between the clients, the start date/time of the connection, and the elapsed time of the connection. The current connections display may also allow a manager to request that connections or attachments be broken. The display may allow users to view connections that involve themselves, and managers may view all current server connections.

Event Database

An event database may store event records as needed to view and analyze server events.

Event Display

The event display may show event data from the event database. The display may include text descriptions of events. The event display may support filtering to display selected types of messages. The event display may order the list according to the contents of different fields. Many possible events may be captured and different types of event displays are possible as are commonly found in the art.

General Communications

Client-to-server communications pass through firewalls using port 80 and/or 8080 HTTP protocol. The communications may be implemented using HTTP functions. These communications appear to the firewalls as standard web traffic, including the use of standard HTTP headers and body data. The communications may be robust enough to immediately detect and appropriately respond to network delays or errors and to clients that unexpectedly break attachments.

The breaks in communications may be determined by the client or the server through monitoring heartbeat signals, connection signals, the lack of communication beyond a set amount of time, and communication errors reported by the lower level socket communications software. As long as neither client has requested a disconnection, the client and server may take immediate action to reestablish communications. For clients, they will initiate post operations. The server will change states to begin waiting for a reconnect. After an extended period of time, the clients and/or server will give up and terminate the connection.

The following paragraphs detail the actions that make up the nine phases described above in the high-level communication process. Since these actions are grouped in terms of their technical domain and not in their order of occurrence during system operation, the associated phase numbers have been included for clarity. FIGS. 4 and 5A-5C shows the data and control flow for these actions. These actions may be performed in various sequences and using various techniques. FIGS. 4 and 5A-5C show a sample embodiment. Other embodiments may be used.

For example, the following description relates to one embodiment where the system attempts to minimize dropped packets with significant error checking and other systems. Alternative embodiments include placing a priority on data throughput at the expense of data integrity or correctness. The alternative embodiments include video streaming where minor errors or data loss is acceptable in favor of performance. Also, with respect to establishing communications, the connections and/or accepted keys may be established by a trusted third party. Of course, all initial set-ups may be client-based or server-based.

Establish Communications (Phase 1)

Figure 5A:
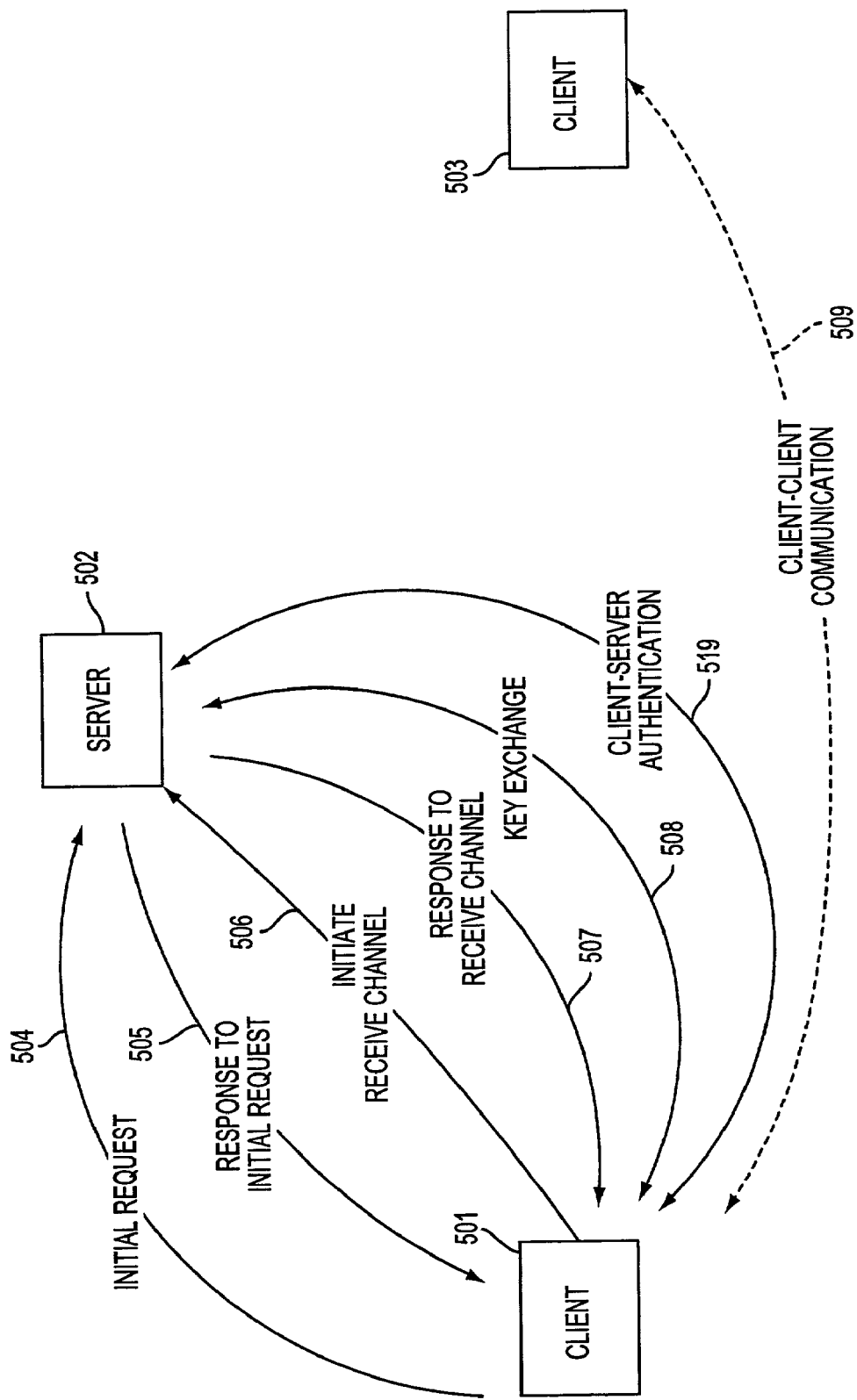
FIGS. 5A, 5B, and 5C show various processes for initiating and establishing a connection between clients using a server in accordance with embodiments of the present invention.
Figure 5B:
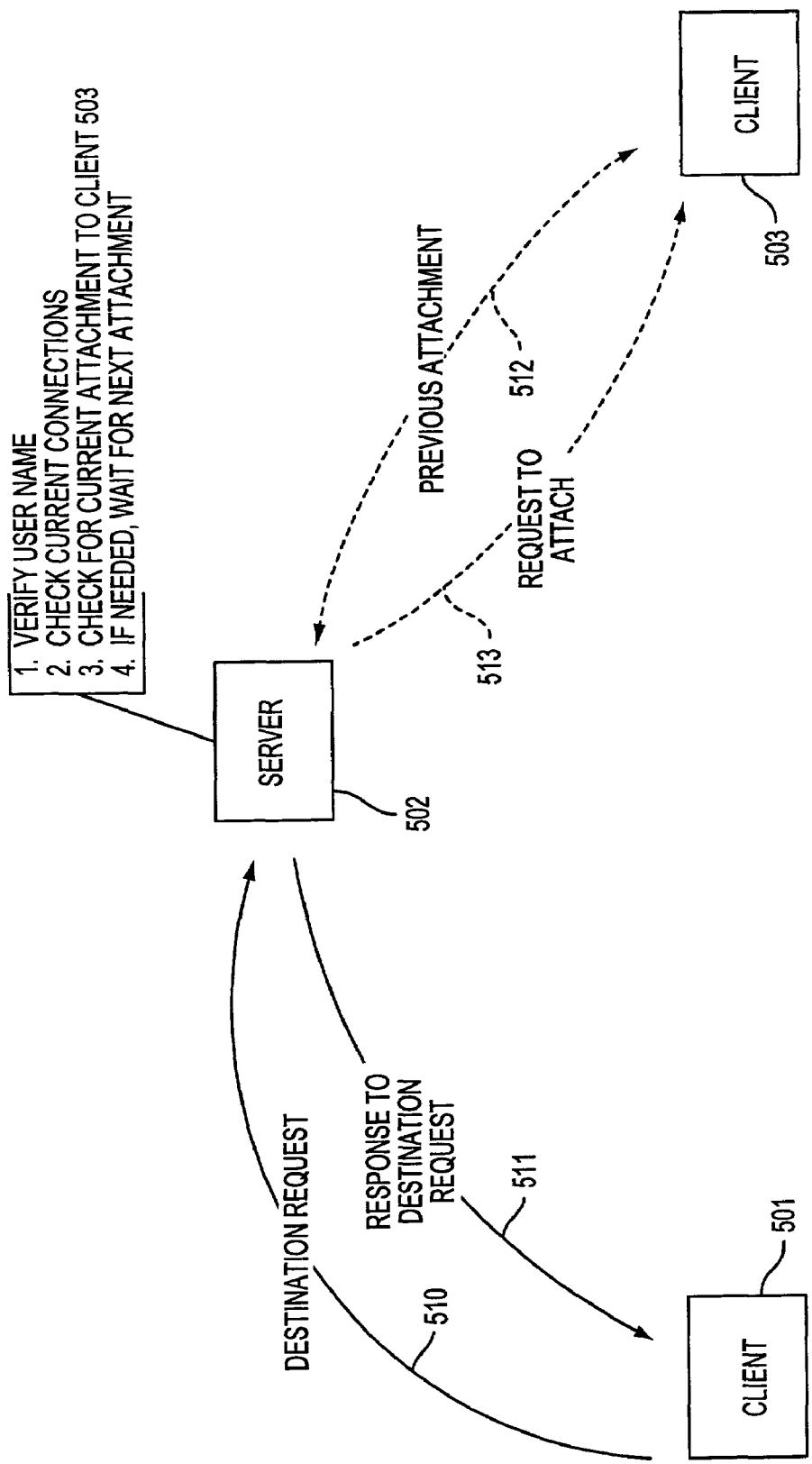
Figure 5C:
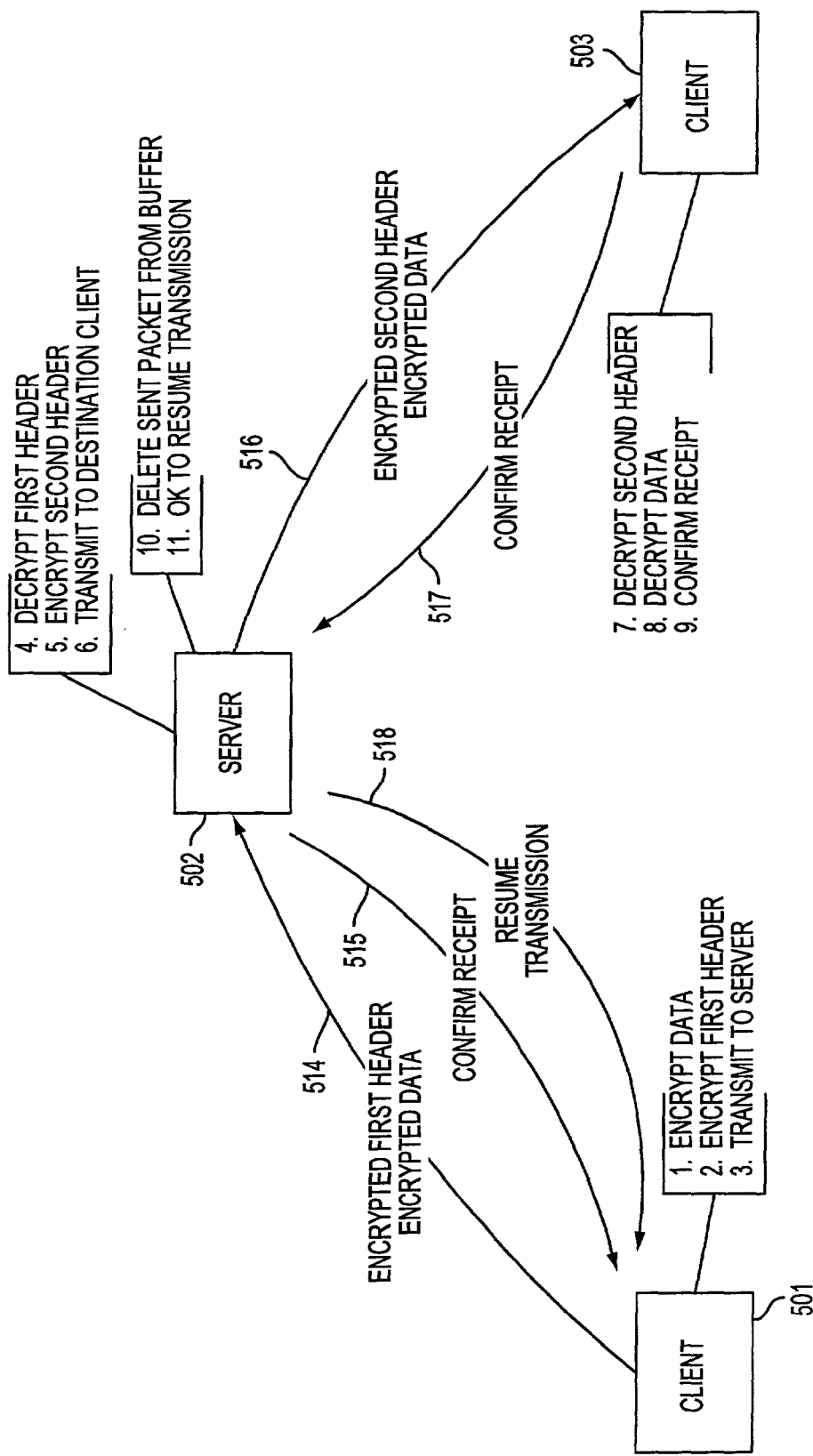

The client and server establish full duplex communications. The specific actions used to establish communications are shown in FIG. 5A and are as follows:

1. Initial URL Request: The client 501 transmits a request 504 to server 502 to establish a connection. The client 501 may use the HTTP post request to connect to the server 502. The client's identifier may be sent with the post data or may be sent at a later time.

Versions of software may be passed. This request initiates the server-to-client session.

2. Server Response to Initial Request: First, the server verifies the initial request. If the initial request does not satisfy the requirements, the request is terminated. If the server confirms the request, it generates an initial connection identifier for identifying future communications to the server. This may take the form of information to be included in all future client-to-server posts. It may also include an attachment identifier. The connection identifier is assigned to identify this client session. The identifier may be a 32-bit integer that results in over 2 billion possible attachment numbers. This information may be encrypted on a rotating encryption schema (as is known in the art) to further secure the transferred information. The server 502 formulates a response 505 authorizing the session and transmits it to the client. If the server does not respond (or the client does not receive the response) within a timeout period, the client automatically sends the initial request again. After a maximum number of retries, the client reports an error to the application.

After the server sends the response 505, the server waits for a timeout period for the next post from the client. If the server does not receive the next post within the timeout period, the server frees memory allocated for the session and invalidates any assigned resources including, but not limited to, the attachment identifier. Further, the server may require two or more levels of verification before assigning resources. This additional requirement furthers the security of the system.

3. Client Initiates the Receive Channel: In response to the communication from the server 502, the client authenticates the server. The client may verify the received information from the server including the resources and other information received from the server. The information from the server may include software identification information or a modified form of the information transmitted by the client. In the example where the modified information is received, the client checks the information to ensure that the information was modified correctly (further ensuring the verity of the server). Next, the client 501 sends a request 506 to the server 502 to establish a receive channel. The client posts to the server the asset identification information from the server (which may include, for example, the attachment identifier) in the post data. This initiates creation of the server-to-client receive channel. If the server does not respond within a timeout period, the client automatically sends this post 506 again. After a maximum number of retries, the client 501 reports an error to the application. In order to maintain a receive channel, if the client 501 detects that the receive channel is broken, the client may send this post 506 again to re-establish the receive channel.

4. Server Responds to Establish the Receive Channel: If the client sends an attachment identifier that does not correspond to an expected attachment identifier, or if the attachment identifier is already associated with an active session, then the server 502 sends back an error code. If the client response is correct, then the server 502 responds with a message 507 that becomes the receive channel. The server 502 uses the attachment identifier to identify the server 502 sessions associated with each message from a client. The receive channel is a response to the HTTP post 507 that is kept open. This allows the server 502 to transmit data at any time via this channel. One advantage is that, to the networks and firewalls, the receive channel looks like a long HTTP download of a binary file. This data passes through firewalls because it is standard HTTP. At the same time, it allows immediate asynchronous transmission from the server to a client 501. This may dramatically reduce the delays associated with passing data through the server 502.

From a network and firewall perspective, the server 502 is passing a very long binary file to the client. The receive channel remains open until the server 502 closes it, the client disconnects, or a network error breaks it. In addition, the server 502 may periodically send a short "keep alive" message (also known as a heartbeat or ping signal) to the client if there are no messages transmitted on the receive channel within the time needed to keep the channel open. The "keep alive" message also maintains the connection through the firewalls. A number of firewalls block an open receive channel if they do not see a response within a given period of time. The "keep alive" messages maintain the asynchronous receive channel by not allowing the firewall to timeout during periods of time when no data is passing from the server to the client. The "keep alive" message also helps the server 502 detect if a client has exited, as in the case of a user rebooting their computer during a connection or attachment.

At this point there is one active server session -the receive channel. This session looks to the network like a large file that is downloading via HTTP. This apparent downloading continues throughout the time the client is attached to the server. If the connection breaks, it is immediately re-established by a new client post operation. Due to the characteristics of server and client post operations, client-to-server communication cannot be implemented in the same way as the receive channel (i.e., by maintaining an open channel). In this example, each message from the client to the server must be a separate post to the server. The messages from the client to the application include the following types of notification: an invalid or out-of-date client software identifier, incompatible client and server software, server not responding; and communication established.

Key Exchange

A unique encryption key is generated for each new connection. A secure public key exchange operation is employed to exchange secret keys and to agree on an encryption key. The final encryption key may have many sizes depending on the level of security required. Good security may be obtained with 56 bits and 128 bits. 256 bits and longer (512, 1024 and longer and all sizes there between) produce security.

Exchange Client-Server Key (Phase 2)

The key exchange process 508 may be implemented as follows:

1. Client Initiated Key Exchange: The client initiates the process to agree on a key length and a key. Also, where key length is previously specified (e.g., 56, 128, 256 and the like), only the key itself needs to be negotiated. The key exchange takes place with a post to the server. The Java-provided Diffie-Hellman method may be used to agree on a secret key. If at any time during the communication an incorrect message is received, then an error message is sent to the application and all communication is terminated. Once the server receives the key, all future client/server communication is encrypted using the client-server key. Further, this process may take place repeatedly with different seed information to regenerate the key. Messages may include:

Client-to-Server: Diffie-Hellman key exchange (and return)

Client to Application: Error during client-server key exchange

Client to Application: Client-server key exchange complete

Exchange Client-Client Key (Phase 7)

When the server sends a connection-established message to each of the associated clients, full data communication is established between the two clients. After the connection is established, the clients may optionally choose to invoke a client-client key exchange/agreement. There are three options for client-client key agreement. The choice of option may be predetermined as well as negotiated between clients. For example, the highest desired encryption level between both clients may be automatically chosen. The application software indicates to the client which key agreement option to use when it calls the client to establish the connection. The available options are:

1. No encryption: The first client passes a message to indicate that the client will not encrypt the application data. This option may be used for applications that choose to encrypt their own data, or for data that does not need to be protected.

2. Pass Key Through the Server: The first client passes a message that contains a new client-client key (168 or 256 or other know sizes). This key is encrypted with the client-server key, unencrypted by the server, re-encrypted with the destination client-server key, and delivered to the destination client. After this exchange, both clients use this key to encrypt the application data.

3. Blind Server Key Exchange: The client-to-client key exchange uses a similar process used in the client-server key exchange.

Alternatively, other key exchanges as are known in the art may be used to add further security. For example, emailing keys, direct dial-up connections, sending a key via regular mail on a diskette, and other known methods of exchanging keys between clients are alternative methods of exchanging keys.

The blind key exchange allows encrypted communication between two clients that cannot be viewed from the server that relays data between them. A standard public key exchange is used between the two clients, with all the packets relayed through the server. Messages related to key exchange include:

Client-to-Client—No encryption

Client-to-Server—Pass key (forward to destination client)

Client-to-Client—Blind Server key exchange

Establish Connection (Phase 6)

The process for establishing a connection between the client and the server is as follows:

1. Client Sends Destination Request: The client 501 sends a request 510 for connection to another client 503 by posting a message to the server 502. The request includes the encrypted destination username and the identification of the desired application. The client 501 may request a connection to a specific client 503. Also, the client 501 may make itself available for connection. This may be done by a number of means including, but not limited to, by posting a wildcard symbol "*". The use of the "*" character for the username by a client indicates that the client will accept connection from any other client component requesting its username and application ID. For example, client 501 may request to connect to "*" with an application ID of "foobar". Client 503 may connect to client 501 by specifying the destination username of "client 501" and an application ID of "foobar". If both clients specify "*" as the destination username, then no connection is made as both are being passive and not initiating a connection.

2. Server Verifies the Username: The server 502 verifies that the client 501's destination username (the user name of client 503) is a valid name registered in the username database. If both of these conditions are not met, the server 502 responds to the destination request 510 with an error message and terminates the attachment between client 501 and server 502.

3. Server Checks Current Connections: The server 502 checks the list of active connections to confirm that no current connection has the same two usernames and application ID as the requested connection. In one implementation, a connection name is constructed from the clients' usernames and the application ID, and checked against a list of connection names maintained by the server 502. Other methods may be used as are known in the art. If an identical connection already exists, then the server 502 returns an error message to the client 501, and the connection request is aborted.

4. Server Check for Current Attachment: The server 502 checks for an attachment awaiting connection that has the same connection information (i.e., clients' usernames and application ID). If a matching attachment is found, then the server 502 makes the connection (i.e., sets up the internal data structures and inter-thread communications) and notifies both clients 501 and 503 of the connection.

The server 502 may find a preexisting attachment made through communication 512 and connect clients 501 and 503. Server 502 may also request client 503 attach to server 502 based on an attempted connection by client 501. This request is shown in dotted line as message 513.

5. Server Waits for Next Attachment: If the server does not find a matching attachment, then the client and its associated connection information are registered as an attachment. The server 502 sends a message to the client 501 indicating that it is waiting for connection. In one embodiment, there is no limit to how long a client may wait. Alternatively, the client 501 may terminate any attachment when no connection is made within a predetermined period.

During this process, the client 501 may send the following message to the server: "Connect to destination user and application ID". Messages from the server 502 to the client 501 (and subsequently passed on to the application) include: "Cannot connect a client to itself", "Destination client username is not registered", "Requested connection already exists", "Connection made, begin communicating", and "Other client is not available, please wait".

Connection Communications (Phase 8)

1. Client Sends Data: After a connection is successfully established, the clients can transmit data for the applications on either end of the connection as shown in path 514. This transmission and reception system is shown in greater detail in FIG. 4. Standard error checking and transmission control protocol/internet protocol (TCP/IP) may be applied. To reduce transmission time, the clients may compress the application data in the transmission packet. Once the data is compressed, the clients may optionally encrypt the application data with a client-to-client key. Each client encrypts the packet header with a unique client-to-server key. So for each packet, the header is encrypted with a client-to-server key, and the data is compressed and optionally encrypted with a client-to-client key. The packet number is encrypted along with the application data. Once encryption is complete, the client sends the packet to the server.

In order to protect all the information and minimize vulnerability to hackers, different elements of the information are encrypted with separate keys to control which computers may process them. The client-to-client information is protected even if the server is compromised because only the two clients have access to the client-to-client encryption key. The server needs to have access to the packet header so that it may verify and forward the data to the correct client. The packet header is therefore encrypted separately with a client-to-server key for each client.

2. Server Receives Data: The server verifies that a packet was received correctly and that it may be transmitted to the destination client. If a packet is correct, the server uses the destination client-server encryption key to encrypt the header, and then writes the packet to the destination client buffer for transmission. The destination client buffer is a first-in-first-out buffer that stores the packets prior to transmission to the destination client.

After successfully receiving a packet and assuming the destination client buffer is not fill, the server sends a message 515 to the source client indicating that the packet was received and that another packet may be sent. This message is implemented as a response to the source client's POST. If the destination client buffer is fill, the server will send a message indicating that the packet was received, but telling the source client to wait before transmitting the next packet. In both of these messages from the server to the source client, the server includes the sequence number of the last packet received by the destination client so the source client knows that it was received correctly and empty its own send buffer.

3. Server Sends Data: The server takes the next packet from the destination client buffer, encrypts the header data with the destination client's client-to-server key, and transmits it (message 516) to the destination client except via the receive channel. Except for verification that the entire packet was received, the server transmits the application data without processing it. The packet sequence number added by the source client is retained and sent to the destination client with the data. If the server detects that the secure channel was lost during packet transmission, the server will wait for the client to reconnect and retransmit the packet.

4. Destination Client Receives Data: Clients continuously monitor their receive channels for errors. If an error is detected, the client 503 reestablishes the channel with a post to the server 502. Any packet that is partially received when a channel error is detected is discarded. When a packet is fully received, the destination client 503 decrypts the header with the client-to-server key. If client-to-client encryption is enabled, the client also decrypts the application data with the client-to-client key. If the data is compressed, the client 503 decompresses it to produce the original application data. The destination client 503 then makes the data available to the application. In response to receipt of the packet, the destination client 503 sends a reply message 517 to the server 502 via a message post. This message may contain any or all of the following information for the server 502: a simple statement that "all information received", the total number of packets received, and the number of the last valid packet received.

5. Server Receives Confirmation of the Receipt of the Data Packet: When the server 502 receives the post 517 from the client 502 that the packet transmitted in message 516 has been properly received, the server 502 removes the associated packet from the destination client buffer. The server 502 then responds to the post by sending the number of the last packet received to the other client 503. The server responds to a post to remain consistent with HTTP. This mechanism allows the client to empty its buffer of transmitted data as the confirmation indicates the remote client received a previous message.

Since the destination client buffer now has room for at least one more packet, the server sends an "OK to Transmit" or resume message 518 to that source client if the source client had previously been told to stop transmitting. This message is transmitted via the receive channel.

Messages between clients 501 and 503 and server 502 associated with Connection Communication include the following:
  Client-to-Server: Application data sent to the server via a post
  Server-to-Client: Response to post, indicating packet receipt and okay to send more data
  Server-to-Client: Response to post, indicating packet receipt and buffer full
  Server-to-Client: Okay to resume transmission
  Client-to-Server: Clear server buffer via post
  Server-to-Client: Response to post, number of last packet received by the destination client Client-Server Message Format Every message sent from a client to the server to another client follows a common message format. The format includes a header and data. The header includes standard header information, including but not limited to: header length, message length, asset identifier, the names of both clients, and the application ID. The header may also include time and date stamps, verified location IDs, message types, attachment identifiers, packet numbers, CRCs, and pre-compressed data size for the message. The header may or may not be encrypted and, in some instances, only parts or none of the header information may be encrypted. For packets containing application data, the encrypted part of the header, if used, may also include the packet identifier (sequence number) and its uncompressed size. This uncompressed size allows the destination client to allocate space for the data when it is decompressed. The header is followed by additional data that depends on the message type. For client-to-client application data messages, it contains the application data. The message length includes the header length, plus the data length. The destination client buffers partial data packets (application data blocks may be broken into multiple smaller packets by the transmitting client) and reassembles them to provide the entire data block to the application.

Further, the data structure transmitted from the clients to the server may include the encrypted header described above. The headers may be encrypted with the client 1-to-server key and data encrypted with the client 1-to-client 2 key. The data structure transmitted from the server to client 2 includes the header encrypted with the client 2-to server key and the data encrypted with the client 1-to-client 2 key. It is noted that there may be a generic client to server key. Also, there may be two keys: client 1-to-server and client 2-to-server. Further, there may be four keys associated with the server: client 1-to-server key, client 2-to-server key, server-to-client 1 key and server-to-client 2 key. When using keys involving the server, the information encrypted with the keys are less secure as the server may decrypt the information.

Messages may include:
  Client-to-Server: Partial data for the destination client
  Client-to-Server: Final data for the destination client Terminate Communications/Connections (Phase 9)

Either one of the clients 501 or 503, or the server 502 may terminate communications. The client 501 or 503 may send a terminate message to the server or to the other client directly or the server 502 may terminate an inactive connection. The manager may also use the system administration pages to remove a connection or request the server to remove an attachment. If an application wants to disconnect, the associated client 501 or 503 will notify the server 502 with a post operation. The server 502 replies to the post with a disconnect acknowledgement message. The server 502 also sends a disconnect message to the other client if a full client-to-client connection is already established. The other client is notified via its receive channel. When either client receives a disconnect message, it discontinues communication with the server and alerts the application.

The server 502 then monitors the receive channels and waits for the clients 501 and 503 to break the connections. When they are broken, the server 502 terminates the connection threads and frees the connection/attachment data structures. When a client 502, the server 502, or a manager terminates a connection, all disconnect messages to the clients are sent via the receive channels.

The messages to terminate communications include:
  Client-to-Server: Terminate connection
  Server-to-Client: Server terminated connection
  Server-to-Client: Remote client terminated connection
  Server-to-Client: Acknowledge client connection termination request
  Manager-to-Server: Terminate a specific connection Encrypt/Decrypt Communications (Phase 3)

Data communication including client names, passwords, message types, and message data is encrypted every time it is transferred across the network. The application data may be optionally encrypted. Various encryption systems may be used. Triple DES is described herein. Other encryption systems that may be used include SSL.

Besides the encryption/decryption required for the DES, two encryption algorithms are required. Both the client and server call routines for encryption/decryption. These are used to encrypt/decrypt header data and application data utilizing the appropriate keys. Each send/receive HTTP session pair (attached client) uses the same encryption key.

Attachment/Connection Authentication

Prior to any exchange of application data, both of the clients and the server are authenticated.

Client-Server Authentication

The following two phases are represented by message set 519.

Client Authentication (Phase 4)

1. Client Initiates Client Authentication: The client reads a user configuration file or the application software may query the user for the user information, or the user information may be obtained by other methods known in the art. The client sends the username and user password to the server.

2. Server Authenticates the Client: The server queries the user database for the given username and verifies that the username is valid and that the user password is correct. If either the username or the user password is invalid, a user/ password error is returned and client session on the server is terminated. Messages may include:

Client-to-Server—Username, user password
    Server-to-Client—Invalid username or password
    Client-to-Application—Client authenticated Server Authentication (Phase 5)

1. Server Sends Authentication Password: If the client sent a valid username and password, then the server returns a message containing the server's password that corresponds to the client.

2. Client Checks Server Password: The client compares the password provided by the server with a local password. The local password may be stored in a file on the application computer, entered by the user, or derived by other methods as are known in the art. If the passwords match, then the server is authenticated and the client may begin passing data. If the server password does not match then the client discontinues communications with the server. No disconnect message is sent to the server if the password is incorrect.

The messages related to server authentication are:
    Server-to-Client—Server password
    Client-to-Application—Could not authenticate the server
    Client-to-Application—Server authenticated A variety of different authentications may be used as are known in the art. In some embodiments, authentications that include digital certificates may be used.

After successful two-way authentication (i.e., client-server and server-client), the client is attached to the server. The attachment, key selection and authentication are complete and the client may request connection to another client.

Client Interface Component

The client interface component is the portion of the system that application integrators use to incorporate this capability into their applications.

Java-based Client Interface

The Java-based client interface is used for web-based applications that run in a browser or for stand-alone Java applications. The code is written in Java and compiled to a jar file. The Java-based client interface class contains procedures to initialize the connection to the server, transmit data, receive data, and close the connection. It implements the following procedures:

Connect (Username, Destination Username, Application Name, Server URL, Password, Encryption Type)

This procedure calls sub procedures to:
      1. Establish Communications
      2. Exchange Client-Server Key
      3. Encrypt Communications
      4. Authenticate the Client
      5. Authenticate the Server
      6. Establish a Connection
      7. Exchange Client-Client Key This procedure returns either an error code and text message, (Example: −100, "server not responding") or a completion code and text message (Example: 100, "Connection complete").

SendData (Data Structure)

This procedure returns after the server has replied to the post message with an "Okay to send" message. Otherwise, it returns an error. If the data is larger than 10 K bytes, then the procedure may separate the data and transmit it in multiple packets.

GetData(Optional Timeout)

This procedure may return the data received from the server or optionally times out.

Disconnect ( )

This procedure sends a message to the server to request that the attachment and any corresponding connection be terminated.

Figure 4:
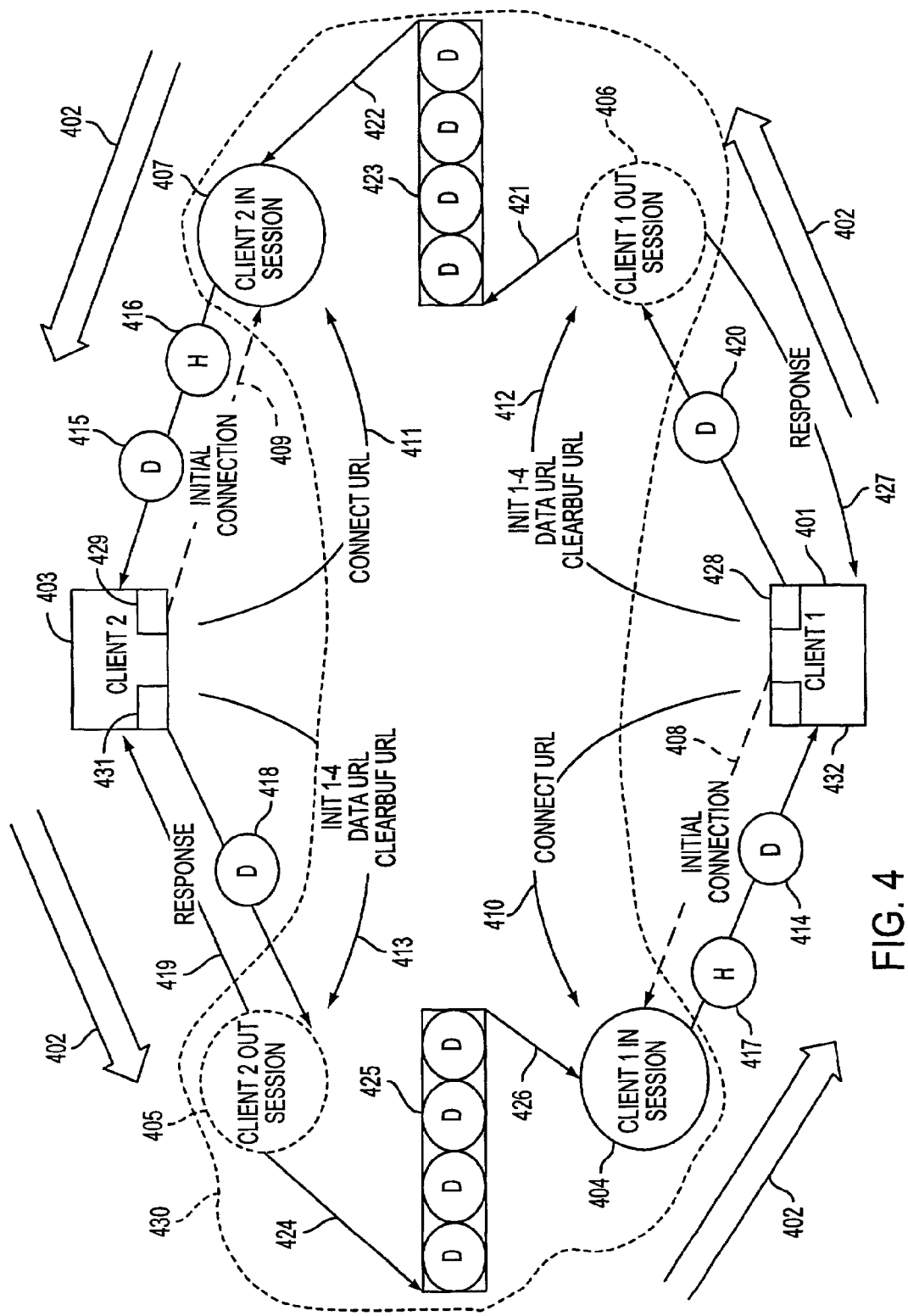
FIG. 4 shows data and control flow between clients in accordance with embodiments of the present invention.

FIG. 4 shows a sample state diagram with two clients 401 and 403. For simplicity, the server is shown as broken circle 430, as the server may be effectively transparent to the two clients 401 and 403. Path 402 shows the general data flow between the two clients 401 and 403. Following path 402 counterclockwise, client 401 desires to transmit data 420 to client 403. Client 401 enters into a client 1 out session 406 in which it attempts to transmit the data 420 to client 403. The data handled in the client 1 out session 406 may be encrypted in client 1 401. Next, the encrypted data 420 is transmitted to the server 430. The server 430 transmits a response 427 back to client 1 401 that the data 420 has been received. The data is transmitted via path 421 to a FIFO buffer 423 (effectively the server). The data eventually reaches client 2 403 via path 422 when client 2 403 is in a client 2 in session 407. Finally, the data is forwarded to client 2 403 as data 415 where it is decrypted 429. While waiting for data, client 403 may receive heartbeat or ping messages 416 from the server 430 to keep its receive channel open. As mentioned above, other methods are known to keep the receive channel open including the client 2 transmitting heartbeat messages to the server to keep the firewall from timing out the connection.

A similar pathway exists from client 2 403 to client 1 401. Here, data is encrypted 431 in client 2 403 (resulting in encrypted data 418) and transmitted from client 2 403 to the server (considering client 2 403 to have moved into a client 2 out session). The server transmits a response 419 back to client 2 403 to indicate that the data 418 has been received. Next, the data passes through a FIFO over path 424 in which it eventually reaches the client 1 in session 404 over path 426. The data 417 is transmitted to client 1 401 where client 1 401 decrypts 432 and passes the decrypted data on to its respective application or applications.

Initial connections with the server are made by the initialization communication phases 1-4 412 and 413 for the transmitting states of the clients 401 and 403. As to the receiving states, the initial connection made by client 2 403 to the server is shown by initial connection 409 and connect URL path 411. A similar initial receive connection by client 1 401 is shown by initial connection 408 and connect URL path 410.

It is noted that the clients may separately connect to the server for receiving and transmitting or may use only one connection. In other words, the invention includes all of communications 410, 411, 412, and 413 being present or less than all shown communications to establish the connection with the server. For example, communications 410 and 413 may exist to establish a connection between client 403 and 401. However, the system would use the same established pathway to communicate in the other direction, as opposed to requiring clients 401 and 403 to initiate communications 411 and 412. Here, the clients are responsible for keeping open the communication pathway between the client and server. For example, the client may continuously poll the server for new data.

An alternative method of keeping open the pathway between the server and client includes the server repeatedly transmitting a packet of information to the client, thereby keeping the client's firewall from closing the established pathway.

Also, the data may or may not be encrypted based on the security level required. Also, the data transmitted between client 1 401 and client 2 403 (intact or as modified or truncated or added to by server 430) may be compressed and decompressed to minimize bandwidth consumption.

Native Client Interface

The code may be written in a number of different languages including C, C++, Java, and the like. In one embodiment, the code is written in Java and compiled into native PC/Windows object code. The native client interface implements the same functionality as the Java-based client interface. The native client interface compiles into a form that is capable of being called from native executable application software without need for a Java virtual machine. Because it is compiled into native machine code, this component does not require a Java virtual machine for execution. This software consists primarily of the generic applet I/O source code with modifications and additions required to make it a stand-alone library component that is callable from C or C++.

Alternatively, one may call Java commands from C without the creation of the native client interface.

Other Interfaces

Distributed systems communicate through a variety of different communication protocols. Many of these protocols are typically blocked by firewalls. Examples of standard communication protocols include Java Remove Method Invocation (RMI), Structured Query Language (SQL) queries, Common Object Request Broker (CORBA), Distribute Common Object Model (DCOM), and X-Windows. Several techniques may be employed to interface with these applications using protocols. Three different approaches are described below.

1. Call Routines: Applications may call the client routines directly. These routines are detailed above.
2. Proxy Routines: Special proxy routines may be created that directly correspond (routine name and parameters) to the standard communication protocol routines. These proxy routines may transfer the call name and parameters through firewalls to another proxy routine that makes the actual call to the standard communication routine to communicate with the destination client. The returned data is then transferred back to the initial proxy routine and returned to the client application. In this way, an application may make standard calls to standard communication protocol routines. The call data and responses are passed between clients by the proxy routines.
3. Port Replication: The port replication approach is similar to the proxy routines except that all communication to a specific standard communication protocol port is captured, transferred, and replicated on the destination client's local network. The sending client uses unmodified standard communication routines. However, instead of communicating with the destination client directly, the client communicates with a local port replication computer on it's local network. That local computer has port replication software that receives data on the standard communication protocol port. It then transfers the data to a remote port replication computer on the destination client's local network. The remote port replication computer sends the data to the destination client using the appropriate port. In this way, the communication is "captured" on one network, transferred, and then sent out on a destination client's local network. One advantage of this approach is that is does not require modifications to the application software except to allow it to communicate to/from a local port replication computer. The port replication software may execute on the client computers along with the applications or on other computers located on each client's local network.

Server Test Set

The server test set is software that may be used to test the operation of the server software either as a standalone component or as a system across multiple computers and networks. It may be used for functional testing, load testing, and performance testing over a wide variety of system configurations and test conditions. The server test set operates by simulating from one to many clients that access the server according to a scripted scenario that allows the user to establish the full spectrum of normal operating conditions for numbers and frequencies of clients attaching, connecting, and disconnecting, as well as packet sizes, encryption methods, and data rates for the simulated connections. The server test set may also be used to inject various types of error conditions that simulate a variety of client computer failure modes and network errors. By varying these different parameters, the server test set may be used to create a complex and dynamic environment that is very realistic for rigorous testing of the server. The server test set may also display the test parameters and the system status to the user during the operation of a test. It may execute on the same computer as the server software or may operate on one or more separate computers either in front of or behind one or more firewalls. This permits realistic performance and load testing to be done with production computers over production networks prior to releasing the server for production in a particular application.

The data that defines a test scenario may be entered into an Excel spreadsheet or other user interface and saved as a data file or as an array of records. Each row in the spreadsheet or record may define the behavior of one of the simulated clients. For example, a file with 100 lines may define a test scenario with 100 attachments and up to 50 potential connections. The server test set may use this file or array to perform the test.

Server Fault Tolerance

In addition the single server system disclosed above, the system may also include multiple servers to allow for continued operation in the event of a server failure. In this event, the system may be implemented to provide fault tolerant operation of the server such that failure of a server that is serving two or more clients causes reversion to another available server to automatically reestablish all connections without loss of data. Possible failures include unanticipated disruption of the execution of the server software due to software or operating system faults, hardware malfunction of the server computer, interruption of electrical power to the server computer, interruption of network communication to the server, and others. One implementation for fault tolerance is to incorporate a list of servers in each client. This list may either be built into the client or downloaded by the client during setup, at run time, or at another time. When a client is ready to attach to a server, the client opens an attachment with the first server on the list. If that client's destination client is already attached, then the two clients negotiate a connection and begin communication. If the destination client is not attached, then the client opens another attachment with the next server on the list, and so on until it has either opened attachments on all of the servers on its list or it connects with its destination client on one of the servers. As soon as a connection is made, both clients release any other attachments they have open on other servers. In the event of a server failure, both clients go to the next server and begin reattaching until they make a new connection. With the data verification and retransmission logic built into the client software, both clients hold and resend any data packets that are lost when a server failure occurs. Including the fault tolerance logic in the client software simplifies the server design and improves system performance because it does not require any communication among servers for live backups, connection hand-off, or data retransmission.

Server backup may exist for servers in pairs as well. For example, two servers may be used in place of server 430 as described in FIG. 4. Each of the servers may forward information primarily or exclusively in one direction (a first transmitting data to client 2 and a second transmitting data to client 1). In this example, a failure of one server (or disruption in connection with the server) may require that both servers be replaced. Alternatively, only the problem server may be replaced.

Figure 3:
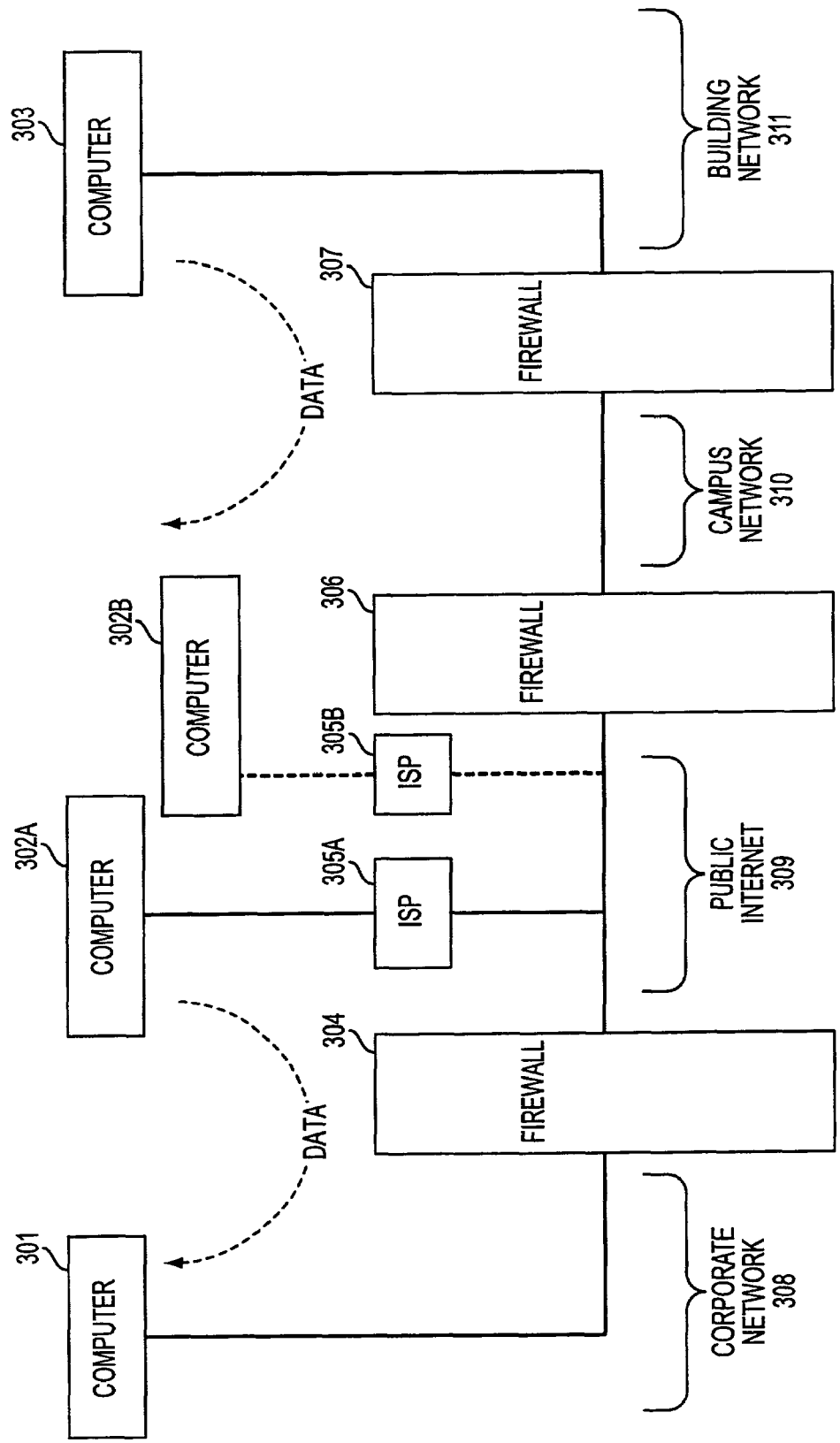
FIG. 3 shows an example data communication system in accordance with embodiments of the present invention.

FIG. 3 shows a connection between computer 303 on building network 311 with data passing through firewall 307, across campus network 310, through firewall 306, across the public Internet 309, to independent service provider (ISP) 305A, then to server computer 302A. The system then retransmits the data from server computer 302A, through ISP 305A, through firewall 304, across corporate network 308, to computer 301. In the case of failure of computer 302A or ISP 305A, back up computer 302B and ISP 302B are used. Further, cross connections between computer 302A and ISP 305B as well as between computer 302B and ISP 305A represent another embodiment. This alternative embodiment provides for failure of computer 302A or ISP 305A without having to transfer over the complete data communication path between public Internet 309 and the computer acting as the server. So, if computer 302A fails, computer 302B would step in to perform the functions of computer 302A. However, instead of requiring computer 302B establish a new line of communication with ISP 305B and the other computers, computer 302B uses computer 302A's ISP 305A, thereby minimizing the number of new instructions needed to be transmitted between the computers.

This approach for server fault tolerance may also be extended to optimize the selection of communication paths for clients automatically. When a client is performing its initial attachments to the servers on its list, it may also measure the performance of each attachment in terms of communication speed and latency. When the two clients begin to negotiate their connection, they sort their joint server list based on the highest to lowest combined performance for those two clients for each server on the list. They then make their first connection with the server offering the highest combined performance connection and revert to the next lower performing connection if that server fails, and so on. This approach is particularly effective when the servers and clients are geographically distributed with a number of different physical connection points to the Internet or other common network. Alternatively, the clients may connect to all servers at the same time then pick the server with the best time (or other criteria, for example, low error rate, highest up time, and guaranteed quality of service (QOS), high security rating and the like) and disconnect from the others.

With the existence of additional computer 302B and/or additional ISP 305B, another embodiment of the invention is realized. The end computers may have multiple links to a number of computers or ISP simultaneously. Here, the communication pathways between end computers may be varied periodically, randomly or pseudo-randomly, thereby establishing communication path diversity. This variation in the pathways provides for enhanced security for the transmitted data because interception of data at one server may be useless without all the data transmitted between end computers.

In the foregoing specification, the present invention has been described with reference to specific exemplary embodiments thereof. Although the invention has been described in terms of various embodiments, those skilled in the art will recognize that various modifications, embodiments or variations of the invention may be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A method of communicating between computers, comprising the steps of:
   (1) transmitting from a first computer to an intermediate server computer a first HTTP POST message through a firewall that is open to outbound Internet traffic, wherein the first HTTP POST message requests establishment of a connection between the first computer and the intermediate server computer over a first return path;
   (2) receiving from the intermediate server computer a response including a connection identifier corresponding to the first return path;
   (3) periodically transmitting from the intermediate server computer to the first computer a "keep alive" message over the first return path, if no further messages are sent to the first computer within a period of time;
   (4) exchanging encryption keys between the first computer and the intermediate server computer;
   (5) repeating steps (1) through (4) between a second computer and the intermediate server computer, thereby creating a second return path between the second computer and the intermediate server computer;
   (6) transmitting encrypted information from the first computer through the firewall to the intermediate server computer using further HTTP POST messages; and
   (7) transmitting the encrypted information from the intermediate server over the second return path.

2. The method of claim 1, further comprising the steps of, in the intermediate server computer, decrypting encrypted information received from the first computer using encryption keys shared between the first computer and the intermediate computer, and then re-encrypting the received information using encryption keys shared between the intermediate computer and the second computer.

3. The method of claim 2, wherein the encrypted information decrypted by the intermediate server computer comprises encrypted header information.

4. The method of claim 3, wherein the encrypted header information comprises one or more of an encrypted IP address, an encrypted username of said second computer, an encrypted header length, an encrypted message length, an encrypted application identifier, an encrypted time and date stamp, and an encrypted message type.

5. The method of claim 1, wherein at least one of the HTTP POST messages transmitted during step (6) comprises an identifier of said second computer encrypted with a first encryption key associated with the intermediate server, and wherein said encrypted information is encrypted with a second different encryption key associated with the second computer.

6. The method of claim 1, wherein communication between the first computer and the intermediate server computer is initiated by the first computer, and wherein communication between the second computer and the intermediate server computer is initiated by the second computer.

7. The method of claim 1, wherein the first firewall and the second firewall are configured not to allow incoming network messages, unless the incoming network messages are responsive to network messages initiated by a computer inside the firewall.

8. The method of claim 1, wherein periodically transmitting a "keep alive" message over the first return path comprises transmitting a "keep alive" message prior to a firewall timeout period to prevent the firewall from blocking traffic on the first receive path.

9. A method of communicating between a first computer protected by a first firewall and a second computer protected by a different second firewall, comprising the steps of:
  (1) at a third computer situated between the first firewall and the different second firewall, receiving a first HTTP message from the first computer through a first firewall that is configured to be open to outgoing HTTP traffic and open to incoming HTTP traffic that is responsive to and linked to outgoing HTTP traffic;
  (2) from the third computer, sending a first response message to the first computer through the first firewall, thereby establishing a first receive channel through the first firewall, wherein the first response message is linked to the first HTTP message;
  (3) at the third computer, receiving a second HTTP message from the second computer through a different second firewall that is configured to be open to outgoing HTTP traffic and open to incoming HTTP traffic that is responsive to and linked to outgoing HTTP traffic;
  (4) from the third computer, sending a second response message to the second computer through the second firewall, thereby establishing a second receive channel through the second firewall, wherein the second response message is linked to the second HTTP message;
  (5) at the third computer, receiving a third encrypted HTTP message from the first computer through the first firewall; determining that the third encrypted HTTP message is intended to be delivered to the second computer, and transmitting to the second computer the third encrypted HTTP message, wherein the third encrypted HTTP message is transmitted over the second receive channel through the second firewall to the second computer; and
  (6) from the third computer, periodically transmitting "keep alive" messages to the first computer over the first receive channel and to the second computer over the second receive channel to avoid a time-out condition.

10. The method of claim 9, wherein step (5) is performed at the third computer by transmitting the third encrypted HTTP message to the second computer without decrypting contents of the third encrypted HTTP message.

11. The method of claim 9, wherein the third encrypted HTTP message comprises:
  an encrypted identifier of the second computer, the identifier encrypted with a first encryption key associated with the third computer, and
  encrypted content for delivery to the second computer, the content encrypted with a different second encryption key associated with the second computer.

12. A method of communicating between a first computer protected by a first firewall and a second computer protected by a different second firewall via a third intermediate computer, comprising the steps of:
  receiving at the third intermediate computer a request transmitted from the second computer through the second firewall, wherein the request is to establish a receive channel between the second computer and the third intermediate computer;
  transmitting from the third intermediate computer a response to the request, the response establishing a receive channel between the third intermediate computer and the second computer that is to be kept open for subsequent transmissions by the third intermediate computer;
  receiving at the third intermediate computer data transmitted from the first computer through the first firewall via a network connection initiated by the first computer;
  determining that the data received from the first computer is intended to be delivered to the second computer; and
  transmitting the data to the second computer via the receive channel, wherein the data received from the first computer comprises an HTTP message encrypted using encryption keys shared between the first computer and the third intermediate computer, and
  wherein the third intermediate computer decrypts the HTTP message received from the first computer and re-encrypts the HTTP message using encryption keys shared between the third intermediate computer and the second computer.

13. The method of claim 12, wherein decrypting the HTTP message comprises decrypting encrypted header information, the encrypted header information comprising one or more of an encrypted IP address, an encrypted username of said second computer, an encrypted header length, an encrypted message length, an encrypted application identifier, an encrypted time and date stamp, and an encrypted message type.

14. A method of communicating between a first computer protected by a first firewall and a second computer protected by a different second firewall via a third intermediate computer, comprising the steps of:
  transmitting a request from the second computer to the third intermediate computer through the second firewall to establish a receive channel between the third intermediate computer and the second computer;
  receiving from the third intermediate computer a response to the request, the response establishing a receive channel between the third intermediate computer and the second computer that is to be kept open for subsequent transmissions from the third intermediate computer; and
  receiving data via the receive channel, wherein the data was transmitted from the first computer to the third intermediate computer through the first firewall via a network connection initiated by the first computer, then transmitted from the third intermediate computer to the second computer via the receive channel,
  wherein the data received via the receive channel comprises an HTTP message from the first computer, the HTTP message encrypted using encryption keys shared between the third intermediate computer and the second computer.

15. The method of claim 14, wherein the encrypted HTTP message comprises encrypted header information including one or more of an encrypted IP address, an encrypted username of said second computer, an encrypted header length, an encrypted message length, an encrypted application identifier, an encrypted time and date stamp, and an encrypted message type.

* * * * *